United States Patent [19]
Chesmer et al.

[11] 3,821,905
[45] July 2, 1974

[54] POLYMERIC FRICTIONAL DRIVE WHEEL WITH REINFORCING STEEL INSERTS

[75] Inventors: Alec David Chesmer, Windham Center, Conn.; Albert M. Ankrom; John T. Vernon, both of Sandford, N.C.

[73] Assignee: Rogers Corporation, Rogers, Conn.

[22] Filed: Dec. 1, 1972

[21] Appl. No.: 311,120

[52] U.S. Cl. .............................. 74/216, 29/159 R
[51] Int. Cl. ........................................ F16h 55/34
[58] Field of Search.......... 74/216, 434, 243 R, 206, 74/216; 57/77.3, 77.4, 77.42; 29/132, 123, 159, 159.3, 530; 277/235; 264/273

[56] References Cited
UNITED STATES PATENTS

| | | | |
|---|---|---|---|
| 1,858,650 | 5/1932 | Weida | 264/273 |
| 2,069,212 | 2/1937 | Buffington | 277/235 |
| 2,637,606 | 5/1953 | Pielop, Jr. | 277/235 |

Primary Examiner—Samuel Scott
Assistant Examiner—Allan Russell Burke
Attorney, Agent, or Firm—Fishman & Van Kirk

[57] ABSTRACT

A drive wheel is presented having a hard synthetic rubber compound molded around a rigid insert. The wheel has a hub section for mounting on a shaft and an outer section for driving contact with a spindlette. The rigid insert has a band around the hub of the wheel to prevent centrifugal expansion and loosening of the wheel on the shaft at high speeds. The outer portion of the insert also prevents outer diameter growth of the wheel to maintain the driven speed of the spindlette within an acceptable tolerance.

6 Claims, 3 Drawing Figures

PATENTED JUL 2 1974  3,821,905
FIG. 1
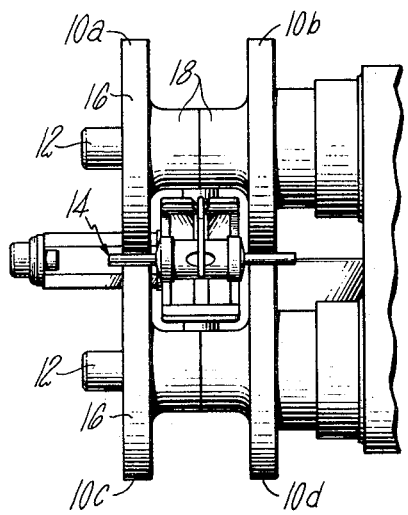
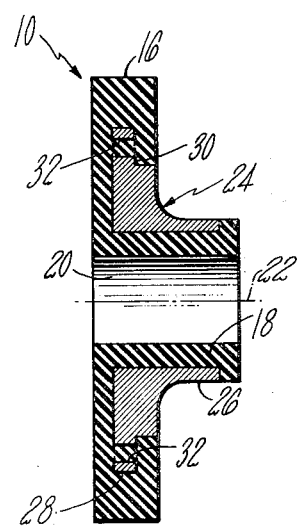
FIG. 2
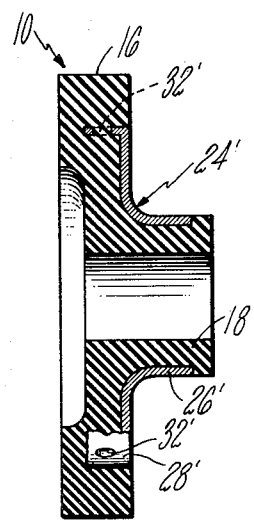
FIG. 3

POLYMERIC FRICTIONAL DRIVE WHEEL WITH REINFORCED STEEL INSERTS

BACKGROUND OF THE INVENTION

This invention relates to the field of drive wheels for imparting a rotational movement to an object to be driven. More particularly, this invention relates to drive wheels for driving the spindlette on texturing equipment such as yarn texturizing machines.

There are many applications in the textile manufacturing and processing industry where machine components must be driven at extremely high speeds to accomplish desired processing operations. One such situation involves spindlettes in yarn processing machinery wherein strands of yarn are passed through the hollow interior of an elongated spindlette. The spindlette is driven at extremely high speeds, such as on the order of 600,000 rpm, to impart desired twist to the yarn passing therethrough. The spindlette is free floating in the sense that it is not supported in bearings or similar support structure. Instead, the spindlette is formed of steel or other magnetically responsive material, and it is drawn by a magnet to driving engagement with the nip of pairs of opposed driving wheels. The spindle may be caused to rotate at speeds of up to typically 400,000–600,000 rpm or even higher, and the drive wheels may rotate at speeds of up to 40,000 rpm or higher in driving the spindlette. It is extremely important to maintain the spindlette speed within a very slight tolerance of approximately ± 1 percent, and thus it is critical to minimize the effects of centrifugal force on the wheels as it might effect the spindlette speed.

One problem encountered in the past has been that centrifugal force causes outward growth of the outer diameter of the drive wheels. This not only causes a change in the speed at which the spindlette is driven, but it also can result in serious damage to the wheels themselves. A typical arrangement has two pair of opposed wheels engaging opposite ends of the spindlette, and the separation between the wheels of an opposed pair is extremely small, such as on the order of 0.030 inches. Outer diamter growth caused by centrifugal forces has actually been known to bring the wheels into contact at their point of smallest design separation, and this contact at extremely high speeds can result in the generation of high friction forces whereby the speed of the spindlette becomes erratic and the wheels also can become overheated and lose the necessary surface characteristics on the driving surfaces of the wheels. The wheels thus become unsuitable for use and must be replaced. A centrifugal force related problem also occurs on the inner diameter of the wheels where the wheels are mounted on their drive shafts. The wheels are typically mounted by an interference fit on their shafts. Bearing in mind that the wheels are made from a very hard, but none-the-less still somewhat resilient polymeric material, the high centrifugal forces resulting from the extremely high rotational speeds have been known in the prior art to cause the hubs of the wheels to separate from the drive shafts thereby resulting either in erratic speed of the spindlette or even resulting in separation of the wheel from its drive shaft.

The above discussed and other related problems have become quite pronounced as the operating speed of texturing machinery has increased in recent years.

SUMMARY OF THE INVENTION

The present invention presents a novel and improved drive wheel configuration wherein a polymeric material such as a hard synthetic rubber compound is molded around a rigid insert. The rubber compound is molded in the form of a driving wheel having a hub segment at the inner diameter and an outer drive surface at the outer diameter. The hard molded rubber configuration lends itself to easy grinding and accurate balancing to obtain drive wheels of desired size and balance with the outer diameter drive surface being particularly suitable for friction drive engagement with the spindlette. The wheel is molded around the rigid insert so that the rigid insert is intermediate of the inner diameter hub and the outer diameter drive surface. The molded rubber at the hub of the wheel is sufficiently resilient to allow an interference fit on its intended drive shaft whereby the wheel can be held securely in position.

The problems encountered in prior art devices wherein centrifugal force could result in outer diameter wheel growth or in separation of the wheel from the drive shaft are overcome in the present invention by the incorporation of the rigid insert around which the wheel is molded. The insert is both bonded to the rubber by the molding process and physically mechanically interlocked by holes in the inserts through which the rubber passes in molding. The resiliency of the molded rubber is such that the interference fit of the hub of the wheel onto the drive shaft can be accomplished. However, the reinforcement provided by the rigid insert limits expansion of the inner diameter of the wheel at the hub under centrifugal forces so that slippage of the wheel with respect to the shaft is minimized or eliminated. Similarly, the bonding and mechanical connection of the molded rubber to the insert prevents or limits outward growth of the outer drive surface of the wheel so that speed drive ratios with respect to the spindlette are maintained within desired ratios. This limiting of the outward growth of the wheel also eliminates the problem of the wheels growing together and becoming damaged by frictional contact therebetween.

Accordingly, one object of the present invention is to provide a novel and improved drive wheel.

Another object of the present invention is to provide a novel and improved drive wheel for yarn texturing machines.

Still another object of the present invention is to provide a novel and improved drive wheel having a body of molded material and wherein the effects of centrifugal forces are eliminated or minimized so as to avoid problems of centrifugal force induced dimensional changes in the wheel.

Still another object of the present invention is to provide a novel and improved drive wheel having a body of molded material which is formed about and mechanically connected to a rigid insert.

Still another object of the present invention is to provide a novel and improved drive wheel having a body of molded material formed about a rigid insert, the insert serving to limit dimensional growth induced by centrifugal forces.

Other objects and advantages of the drive wheel of the present invention will be apparent to and understood by those skilled in the art from the following detailed description and drawings.

BRIEF DESCRIPTION OF THE DRAWINGS

Referring now to the drawings wherein like elements are numbered alike in the several figures:

FIG. 1 is a top plan view of a plurality of the drive wheels of the present invention in the operating environment of driving a spindlette in a yarn texturing machine.

FIG. 2 is a sectional view of one form of a drive wheel of the present invention.

FIG. 3 is a modified form of a drive wheel of the present invention.

DESCRIPTION OF THE PREFERRED EMBODIMENT

Referring now to FIG. 1, drive wheels 10 of the present invention are shown in the environment of a drive array for a spindlette of a yarn texturizing machine. The wheels are mounted in pairs of a set of spaced apart drive shafts 12. The wheels are ground to size and balanced to form double wheel combinations for driving by friction engagement a texturizing spindlette 14 positioned at the nip formed by correspondingly opposed wheels of the pairs of wheels. The sizing of the wheels is such that the correspondingly opposed wheels 10a–10c and 10b–10d have a gap of only about 0.030 inches at the point of smallest separation between their ground drive surfaces 16. The spindlette 14 is pulled into the nip of opposed sets 10a–10c and 10b–10d by a magnet (not shown) so that the spindlette is held in firm driving engagement with drive surfaces 16 and is free to rotate by the frictional engagement with drive surfaces 16. The drive shafts 12 are driven in the appropriate direction to drive the spindlette within very close tolerances (± 1 percent) of a desired speed in a desired direction.

Referring now to FIG. 2, one form of drive wheel of the present invention is shown. The main body of wheel 10 is molded so as to form the drive surface 16 at the outer portion of the wheel and also to form an axially elongated hub section 18 with a cylindrical passage 20, wheel 10 having an axis 22.

The molded body of the wheel is preferably formed of natural rubber or synthetic rubbers such as butadiene — acrylonitrile, butadiene-styrene, ethylene propylene copolymers, epichlorohydrin, urethane polymers or other similar polymeric materials. The wheel is molded and appropriately treated so as to form a molded wheel having a hardness of typically, but not restricted to, 70 Shore D Scale, and preferably within a range of 65 to 75 Shore D Scale. The outer diameter drive surface 16 is ground to form a friction surface sufficient to drive the metal spindlette, while, at the same time, sufficient compliance is retained so that the hub segment 18 can be mounted on a suitable drive shaft by an interference fit.

A rigid annular insert 24 is located in the body of wheel 10 to provide reinforcement for the wheel. Insert 24 may be of metal, plastic or other suitable rigid reinforcing material. Insert 24 has an axially elongated hub section 26 of larger diameter than the inner diameter of wheel hub 18 and an outer diameter section 28 of smaller diameter than drive surface 16. Thus, the hub section of insert 24 forms a band which surrounds and reinforces the hub 18 at a position spaced from the interior of the hub, and outer diameter section 28 of the insert terminates short of drive surface 16 to provide interior reinforcement for the outer diameter portion of the wheel.

The molded main body of the wheel is molded about insert 24 so that a firm adhesion bonding between the rubber and the insert occurs during the molding process. In addition, the outer diameter section 28 of the insert has a stepped segment 30 of reduced thickness with a plurality of holes 32 passing therethrough spaced about the annular contour of stepped portion 30. This stepped portion at the outer diameter section of the insert permits the molded rubber to not only adhere to opposite surfaces of the insert but also to pass through the array of holes 32 to form a mechanical interlock between the molded rubber and the rigid insert.

Referring now to FIG. 3, a modified version of the wheel and insert is shown. In the configuration of FIG. 3 the insert 24' is of lesser bulk than the FIG. 2 insert and essentially just conforms to the outer contour of the wheel between the hub 18 and drive surface 16. It will, however, be noted that insert 24' has an elongated hub section 26' forming a band which provides reinforcement for hub 18 and an outer diameter section 28' which provides reinforcement for drive surface 16. Outer diameter section 28' is in the form of an annular ring extending into the molded body of the wheel parallel to and concentric with drive surface 16. As with the FIG. 2 embodiment, there is adhesion bonding between the molded wheel body and the rigid insert. The ring 28' provides a pair of opposed surfaces for adhesion bonding, and an array of holes 32' passing through the annular ring 28' also provides for mechanical interlocking between the molded material and the rigid insert.

In both of the wheel embodiments shown herein, the hub section of the insert provides reinforcement for the hub of the wheel. The hub section of the insert is of larger diameter than the hub of the wheel so that only the molded rubber lines passage 20. Thus, the wall of passage 20 is of sufficient compliance to enable the wheel to be mounted on shaft 12 with an interference fit. However, the hub section of the insert limits the outward expansion of the inner diameter of the wheel hub under the centrifugal load of extremely high rotating speed so that the wheel does not come loose and either wobble on or fly off the shaft. Similarly, the outer diameter section of the insert stops short of drive surface 16 so that drive surface 16 is formed only of the molded material of desired hardness and frictional characteristics for driving the spindlette. The outer diameter section of the insert does, however, reinforce the outer diameter portion of the wheel to limit the outward growth of drive surface 16 under the centrifugal load of extremely high rotating speeds so that driving speeds for the spindlette are maintained within a desired tolerance range (such as ± 1 percent) and opposed pairs of the wheels are prevented from growing into contact which might damage them. It will be noted that the array of holes in the outer diameter section of the insert whereby mechanical interlocking of the molded wheel body to the insert takes place is an important factor in limiting the outward growth of the outer diameter section of the wheel since it provides for a true physical interlocking and reinforcement of the molded material by and with the insert.

While a preferred embodiment has been shown and described it will be understood that various modifications and substitutions can be made thereto without departing from the spirit and scope of the present invention.

What is claimed is:

1. A reinforced drive wheel including:
   a wheel body of molded polymeric material, said wheel body having an axis and an inner diameter and an outer diameter spaced from said axis;
   a drive surface on said wheel at said outer diameter;
   an axially elongated hub at said inner diameter said elongated hub being of greater axial width than the width of said drive surface; and
   a reinforcing insert in said wheel body between said inner and outer diameters, said insert being of greater rigidity and mechanical strength than said wheel body to reduce the effect of centrifugal forces on said wheel;
   said reinforcing insert having an inner section spaced from the axis of said wheel a distance greater than the inner diameter of said wheel and said reinforcing insert having an outer section spaced from the axis of said wheel a lesser distance than the outer diameter of said wheel.

2. A reinforced drive wheel as in claim 1 wherein:
   said insert is an annular body, the inner section of said insert being elongated with respect to said axis of said wheel and surrounding said hub.

3. A reinforced drive wheel as in claim 2 wherein:
   said polymeric material is adhesion bonded to at least part of said insert.

4. A reinforced drive wheel as in claim 3 wherein:
   said outer section of said insert has a plurality of holes therethrough, said molded polymeric material being adhesion bonded to a pair of opposed surfaces of said outer section and said polymeric material being mechanically interlocked with said outer section by passing through said holes.

5. A reinforced drive wheel as in claim 1 wherein:
   said wheel body has a hardness of from 65 to 75 Shore D Scale.

6. A reinforced drive wheel as in claim 5 wherein:
   said wheel body is a natural or synthetic rubber.

* * * * *